United States Patent
Lu et al.

(10) Patent No.: US 9,654,022 B2
(45) Date of Patent: May 16, 2017

(54) POWER CONVERSION DEVICE AND CONTROL METHOD THEREOF

(71) Applicant: DELTA ELECTRONICS, INC., Taoyuan (TW)

(72) Inventors: Liang-Wei Lu, Taoyuan (TW); Yung-Wei Peng, Taoyuan (TW); Jui-Ling Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/925,998

(22) Filed: Oct. 29, 2015

(65) Prior Publication Data
US 2016/0315550 A1 Oct. 27, 2016

(30) Foreign Application Priority Data

Apr. 24, 2015 (TW) .............................. 104113155 A (51) Int. Cl.
| | |
|---|---|
| *H02J 9/06* | (2006.01) |
| *H02M 7/217* | (2006.01) |
| *H02M 7/04* | (2006.01) |
| *H02M 1/10* | (2006.01) |
| *H02M 1/32* | (2007.01) |

(52) U.S. Cl.
CPC ............... *H02M 7/04* (2013.01); *H02M 1/10* (2013.01); *H02M 1/32* (2013.01)

(58) Field of Classification Search
CPC .. H02M 1/10; H02M 7/217; H02J 9/04; H02J 9/06; H02J 9/061; G06F 1/263
See application file for complete search history.

(56) References Cited

U.S. PATENT DOCUMENTS

| | | | | |
|---|---|---|---|---|
| 5,241,217 A | * | 8/1993 | Severinsky | H02J 9/065 307/64 |
| 5,499,187 A | | 3/1996 | Smith | |
| 5,982,652 A | * | 11/1999 | Simonelli | H02J 9/062 307/26 |
| 7,190,091 B1 | | 3/2007 | Marshall | |
| 8,492,928 B2 | * | 7/2013 | Pyboyina | H02J 9/062 307/64 |
| 9,024,476 B2 | * | 5/2015 | Ghosh | H02J 9/062 307/66 |

OTHER PUBLICATIONS

The pertinent parts of US 7190091 B1.
The pertinent parts of US 5499187.

* cited by examiner

*Primary Examiner* — Gary L Laxton
(74) *Attorney, Agent, or Firm* — CKC & Partners Co., Ltd.

(57) ABSTRACT

A power conversion device is disclosed herein. The power conversion device includes an AC-DC conversion unit, a switching unit and a bypass circuit. The AC-DC conversion unit is configured to receive an AC input voltage via a power input terminal, and output a DC output voltage to a power output terminal according to the AC input voltage. The switching unit is configured to be switched off according to the AC input voltage received from the power input terminal, and to be switched on according to a DC input voltage received from the power input terminal. The bypass circuit is configured to receive the DC input voltage via the switching unit, and output the DC output voltage to the power output terminal according to the DC input voltage.

12 Claims, 6 Drawing Sheets

POWER CONVERSION DEVICE AND CONTROL METHOD THEREOF

RELATED APPLICATIONS

This application claims priority to Taiwan Application Serial Number 104113155 filed on Apr. 24, 2015, which is herein incorporated by reference.

BACKGROUND

Field of Invention

The present invention relates to an electrical power device. More particularly, the present invention relates to a power conversion device.

Description of Related Art

Recently, in order to provide backup direct current (DC) power to a next stage system when alternating current (AC) power of mains electricity is abnormal, a variety of power conversion devices are required to transmit high-voltage AC signals and low-voltage DC signals through different lines.

However, conventional circuit designs of the power conversion devices are complicated and have security issues because they have to adapt to different input signals and correspondingly control their circuit operations.

Therefore, how to simplify the design of the power conversion devices and efficiently manage the high-voltage AC signal and the low-voltage DC signal for guaranteeing the line security are important research topics and also are objectives required to be improved in the related art.

SUMMARY

To solve the above problems, one aspect of the present invention provides a power conversion device. The power conversion device includes an AC/DC conversion unit, a switch unit and a bypass circuit. The AC/DC conversion unit is configured to receive an AC input voltage through a power input terminal, and output a DC output voltage to a power output terminal according to the AC input voltage. The switch unit is switched off according to the AC input voltage received from the power input terminal, and is switched on according to a DC input voltage received from the power input terminal. The bypass circuit is configured to receive the DC input voltage through the switch unit, and output the DC output voltage to the power output terminal according to the DC input voltage.

In an embodiment of the present invention, the bypass circuit includes an overvoltage protection unit. The overvoltage protection unit is electrically connected to the switch unit and configured to turn off the bypass circuit when a voltage signal outputted from the switch unit is greater than a predetermined value.

In an embodiment of the present invention, the overvoltage protection unit includes a fuse, a varistor and a transient voltage suppression (TVS) diode. A first terminal of the fuse is electrically connected to the switch unit. A first terminal of the varistor is electrically connected to the second terminal of the fuse and a second terminal. The TVS diode has a first terminal electrically connected to the second terminal of the fuse and a second terminal electrically connected to the second terminal of the varistor.

In an embodiment of the present invention, the bypass circuit further includes a DC/DC conversion unit. The DC/DC conversion unit is configured to receive the DC input voltage and convert the DC input voltage into the DC output voltage.

In an embodiment of the present invention, the bypass circuit includes a current blocking unit. The current blocking unit has a first terminal electrically connected to the switch unit and a second terminal electrically connected to the power output terminal, and configured to prevent a reverse current from flowing from the power output terminal into the bypass circuit.

In an embodiment of the present invention, the bypass circuit further includes an input signal detection unit electrically connected to the current blocking unit. When the power input terminal receives the AC input voltage, the input signal detection unit is configured to output a detection signal having a first level to a next stage system. When the power input terminal receives the DC input voltage, the input signal detection unit is configured to output the detection signal having a second level to the next stage system.

In an embodiment of the present invention, the input signal detection unit detects whether the power input terminal receives the AC input voltage or the DC input voltage according to a voltage level of the first terminal of the current blocking unit.

In an embodiment of the present invention, power conversion device further includes a filter unit. The filter unit is electrically connected to the AC/DC conversion unit, and configured to filter a DC voltage signal outputted from the AC/DC conversion unit to output the DC output voltage.

Another aspect of the invention provides another power conversion device. The power conversion device includes an AC/DC conversion unit, a switch unit, an input signal detection unit, a current blocking unit and an overvoltage protection unit. The AC/DC conversion unit is electrically connected to a power input terminal, and configured to receive an AC input voltage through the power input terminal, and output a DC output voltage to a power output terminal according to the AC input voltage. The switch unit is electrically connected to the power input terminal. The switch unit is switched off according to the AC input voltage received from the power input terminal, and is switched on according to DC input voltage received from the power input terminal. The input signal detection unit is configured to output a detection signal having a first level to a next stage system according to the AC input voltage, and output the detection signal having a second level to the next stage system according to the DC input voltage. The current blocking unit has a first terminal electrically connected to the input signal detection unit and a second terminal electrically connected to the power output terminal, and configured to keep a reverse current from flowing from the power output terminal into the input signal detection unit. The overvoltage protection unit is electrically connected between the switch unit and the input signal detection unit, and configured to turn off the switch unit and the input signal detection unit when a voltage signal outputted from the switch unit is greater than a predetermined value.

Another aspect of the invention provides a control method for the power conversion device. The control method includes: turning off, by the switch unit, the bypass circuit and outputting, by the AC/DC conversion unit, a DC output voltage according to an AC input voltage when the power input terminal receives the AC input voltage; and turning on, by the switch unit, the bypass circuit and outputting, by the bypass circuit, the DC output voltage according to a DC input voltage when the power input terminal receives the DC input voltage.

In an embodiment of the present invention, the control method further includes: outputting, by the input signal detection unit, a detection signal having a first level to a next stage system when the power input terminal receives the AC input voltage; and outputting, by the input signal detection unit, the detection signal having a second level to the next stage system when the power input terminal receives the DC input voltage.

In summary, the technical solution of the present invention have obvious advantages and beneficial results. Significant improvement is achieved due to the technical solution, and it has great utility values in the industry. In the embodiments of the present invention, no matter receiving the high-voltage AC power or the low-voltage DC power, the power conversion device can switch automatically through the configuration of the switch unit, and thus a stable output voltage is outputted to the next stage system. It simplifies the complicated circuit design and the control method in the prior art and manages the power efficiently so that the power conversion device is more secure.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. In addition, in accordance with the standard practice in the industry, various features are not drawn to scale. In fact, the dimensions of the various features may be arbitrarily increased or reduced for clarity of discussion. In the specification, same units will be described with same labels for the sake of understanding.

Terms used in the specification and the claims have general meaning, unless it is particularly noted, of the terms used in this field, in the content of the description and in the special content. Some terms used for describing the disclosure will be discussed below or in other part of the specification to provide an additional guide of description related to the disclosure for people in the art.

Moreover, terms of "comprise", "include", "have", etc. are open transitional phrases meaning "include but not limited to". In addition, the usage of "and/or" in the specification includes any one of the listed items or a combination of the items.

In the specification, when a unit is "connected" or "coupled" to another unit, it means "electrically connected" or "electrically coupled". "Connected" or "coupled" may also represent interactions between two or more units. The using of "first", "second", "third", etc. in the specification should be understood for identify units or data described by the same terminology, but are not referred to particular order or sequence unless it is clearly specified in the context.

Figure 1:
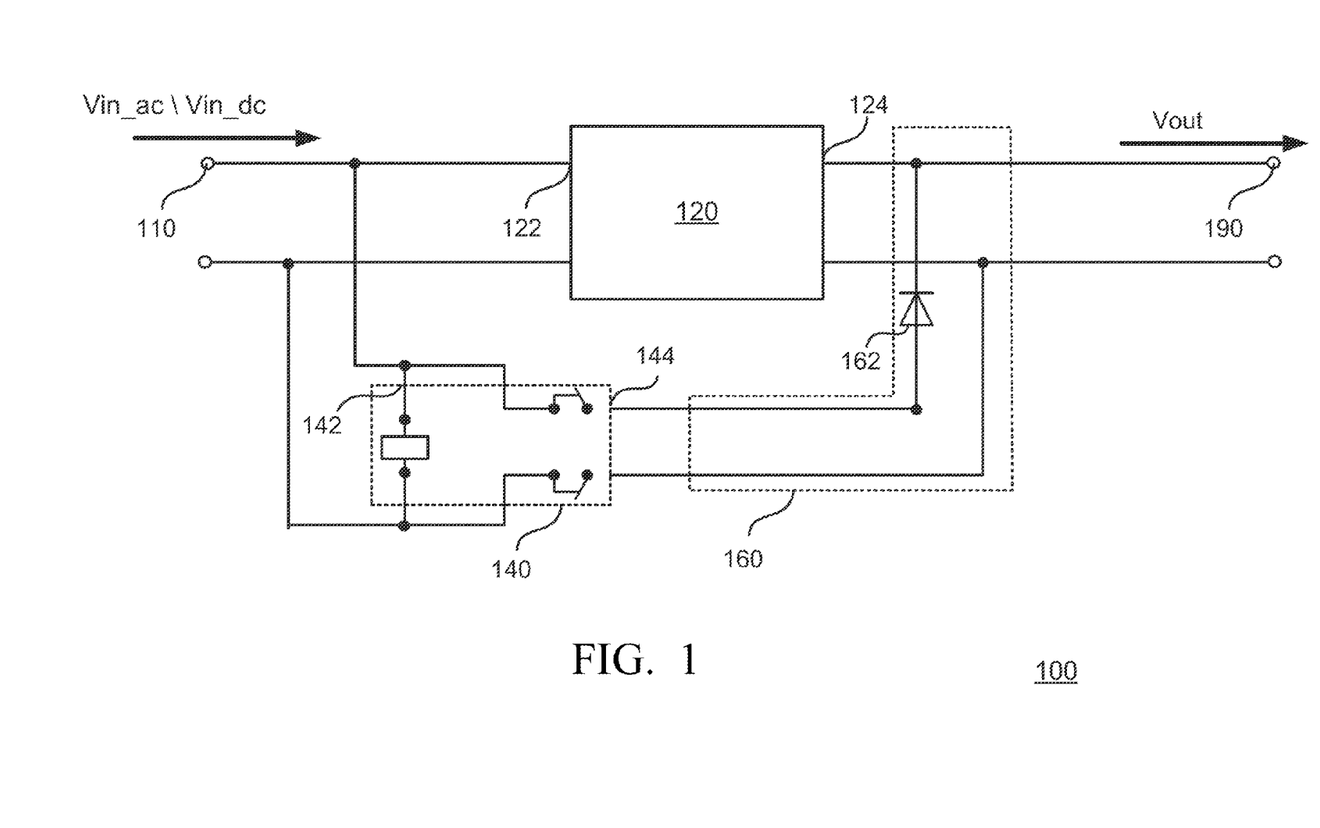
FIG. 1 is a schematic diagram illustrating a power conversion device according to an embodiment of the present invention.

Referring to FIG. 1, FIG. 1 is a schematic diagram illustrating a power conversion device 100 according to an embodiment of the present invention. In the embodiment, the power conversion device 100 includes a power input terminal 110, an AC/DC conversion unit 120, a switch unit 140 and a bypass circuit 160. In the structure, a first terminal 122 of the AC/DC conversion unit 120 is electrically connected to the power input terminal 110, and a second terminal 124 of the AC/DC conversion unit 120 is electrically connected to the power output terminal 190. A first terminal 142 of the switch unit 140 is electrically connected to the power input terminal 110. A second terminal 144 of the switch unit 140 is electrically connected to a first terminal of the bypass circuit 160. A second terminal of the bypass circuit 160 is electrically connected to the power output terminal 190.

In the embodiment, the power input terminal 110 selectively receives an AC input voltage Vin_ac or a DC input voltage Vin_dc. For example, when the mains electricity provides power normally, a previous stage system outputs the normal AC input voltage Vin_ac (e.g. AC voltage having 90 to 264 volts) to the power input terminal 110. In contrast, when detecting that the mains electricity is abnormal, the previous stage system may switch to a backup power source such as a backup battery unit (BBU) to provide the DC input voltage Vin_dc (e.g. DC voltage having 12 to 48 volts).

When the power input terminal 110 receives the AC input voltage Vin_ac, the AC/DC conversion unit 120 outputs a DC output voltage Vout to a power output terminal 190 according to the AC input voltage Vin_ac. To be specific, the AC/DC conversion unit 120 can be implemented as any types of AC-DC converter such as a Buck converter, a Flyback Converter, etc.

Via the AC/DC conversion unit 120, the power conversion device 100 converts the AC input voltage Vin_ac into the DC output voltage Vout, and adjusts the voltage level of the DC output voltage Vout according to practical requirements. For example, the AC/DC conversion unit 120 may rectify the AC voltage having 90 to 264 volts and reduces its voltage into 12 volts as the DC output voltage Vout.

In the embodiment, the switch unit 140 is selectively switched on or off according to whether the power input terminal 110 receives the AC input voltage Vin_ac or the DC input voltage Vin_dc. In detail, when the power input terminal 110 receives the AC input voltage Vin_ac, the switch unit 140 is switched off automatically and turns off the bypass circuit 160, such that the AC/DC conversion unit 120 outputs the DC output voltage Vout according to the AC input voltage Vin_ac.

In contrast, when the power input terminal 110 receives the DC input voltage Vin_dc, the AC/DC conversion unit 120 is not activated when the AC/DC conversion unit 120 has a function of brown out detection because the voltage level of the DC input voltage Vin_dc is lower than the working voltage level of the AC/DC conversion unit 120.

In this case, the switch unit 140 is switched on automatically and turns on the bypass circuit 160 which outputs the DC output voltage Vout according to the DC input voltage Vin_dc. As shown in FIG. 1, the switch unit 140 may be implemented as a relay. The relay is automatically switched on or off in a way of electromagnetic induction according to a voltage variation between its two terminals so that the relay is selectively switched on or off according to whether the power input terminal 110 receives the AC input voltage Vin_ac or the DC input voltage Vin_dc. For example, when the power input terminal 110 receives the AC input voltage Vin_ac, the relay is off because the AC input voltage Vin_ac is higher than a pull-in voltage of the relay. In contrast, when the power input terminal 110 receives the DC input voltage Vin_dc, the relay is on because the DC input voltage Vin_dc is lower than a release voltage of the relay.

In the embodiment of FIG. 1, the bypass circuit 160 takes the DC input voltage Vin_dc as the DC output voltage Vout because the DC input voltage Vin_dc and the DC output voltage Vout have the same voltage level (e.g. 12 volts).

Note that the bypass circuit 160 may include a current blocking unit 162 for keeping a reverse current from flowing from the power output terminal 190 into the bypass circuit 160, and thus avoid the reverse current damaging the circuit units in the bypass circuit 160. In the embodiment, the current blocking unit 162 is a blocking diode, but the invention is not limited thereto.

As a result, no matter the power input terminal 110 receives the AC input voltage Vin_ac (e.g. AC power having 20 volts) or the DC input voltage Vin_dc (e.g. DC power having 12 volts), the power conversion device 100 is capable of outputting the DC output voltage Vout (e.g. DC power having 12 volts) for a next stage system.

Figure 2:
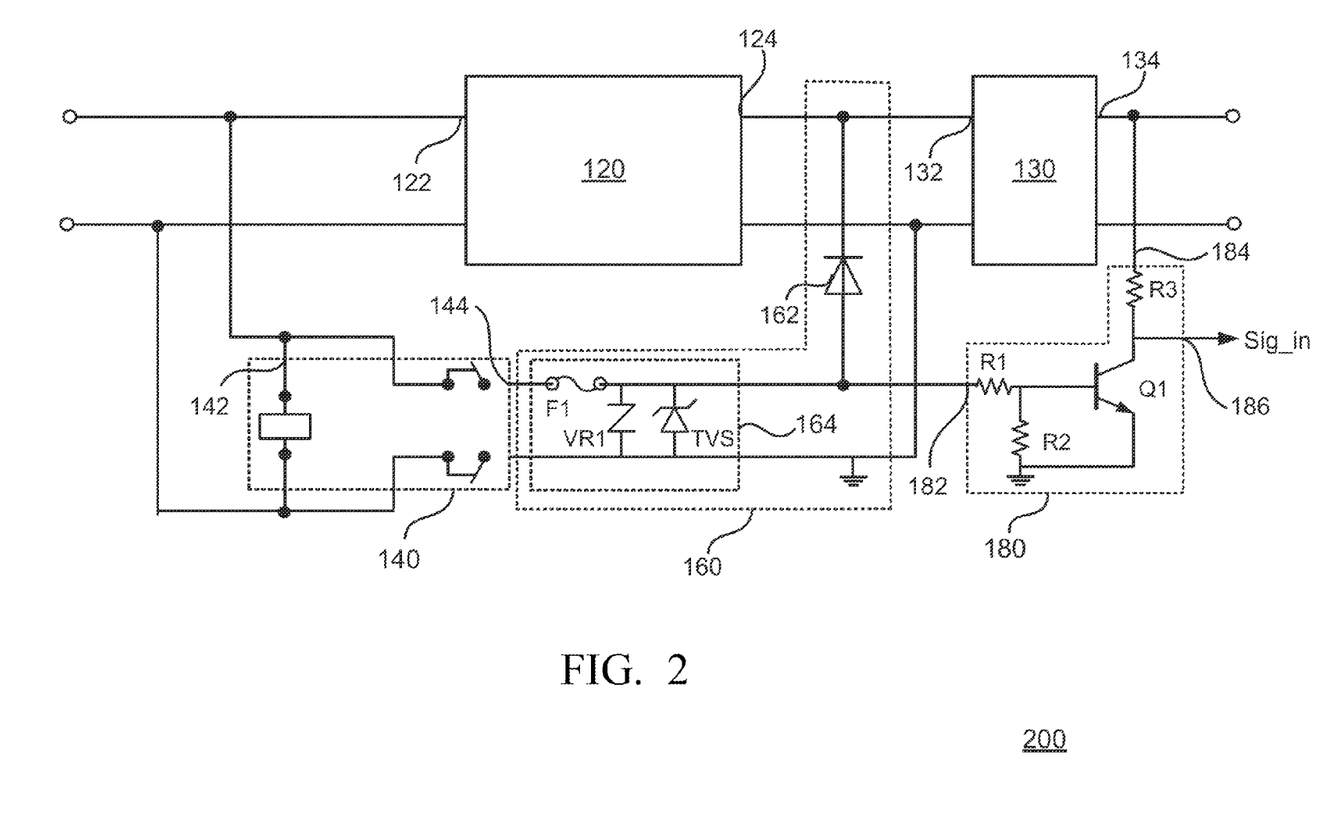
FIG. 2 is a schematic diagram illustrating the power conversion device according to an embodiment of the present invention.

Referring to FIG. 2, FIG. 2 is a schematic diagram illustrating a power conversion device 200 according to an embodiment of the present invention. As shown in FIG. 2, the power conversion device 200 further includes a filter unit 130 and an input signal detection unit 180. The bypass circuit 160 further includes an overvoltage protection unit 164.

The overvoltage protection unit 164 is electrically connected to the second terminal 144 of the switch unit 140 for turning off the bypass circuit 160 when the voltage signal outputted from the switch unit 140 is greater than a predetermined value. The performance of the switch unit 140 may be degraded due to factors such as environment temperature, long-term usage, and abnormal operation. Therefore, the switch unit 140 may not operate properly, that is, not being switched off when the power input terminal 110 receives the AC input voltage Vin_ac, and thus the high-voltage AC input voltage Vin_ac flows into the bypass circuit 160. In this case, the overvoltage protection unit 164 turns off the bypass circuit 160 when detecting that the voltage signal outputted from the switch unit is greater than the predetermined value. Therefore, the circuit components in the next stage circuit is protected from high voltages or high currents.

To be specific, as shown in FIG. 2, the overvoltage protection unit 164 may be implemented as a fuse F1, a varistor VR1, and a transient voltage suppression (TVS) diode to reduce a pulse and turn off the bypass circuit 160 when the switch unit 140 does not work normally in order to protect the circuit components.

In the embodiment, a first terminal of the fuse F1 is electrically connected to the second terminal 144 of the switch unit 140. A first terminal of the varistor VR1 is electrically connected to a second terminal of the fuse F1. A second terminal of the varistor VR1 is electrically connected to the ground. The TVS diode TVS and the varistor VR1 are connected in parallel, in which a first terminal is electrically connected to the second terminal of the fuse F1, and a second terminal is electrically connected to the second terminal of the varistor VR1.

As a result, the TVS diode TVS and the varistor VR1 can be used to absorb a pulse. When receiving a voltage signal greater than the predetermined value, the fuse F1 is blown to turn off the bypass circuit 160.

Note that the specific circuit of the overvoltage protection unit 164 shown in FIG. 2 is just an example and the invention is not limited thereto. People in the art should be able to modify or alter the circuit to archive the function of the overvoltage protection unit 164.

In an embodiment of the invention, the power conversion device 200 includes an input signal detection unit 180. In the structure, a first terminal 182 of the input signal detection unit 180 is electrically connected to a first terminal (e.g. a positive terminal) of the current blocking unit 162. A second terminal 184 of the input signal detection unit 180 is electrically connected to the power output terminal 190. An output terminal 186 of the input signal detection unit 180 is used to output a detection signal Sig_in.

The input signal detection unit 180 can detect whether the power input terminal 110 receives the AC input voltage Vin_ac or the DC input voltage Vin_dc according to a voltage level of the first terminal (e.g. the positive terminal) of the current blocking unit 162. When the power input terminal 110 receives the AC input voltage Vin_ac, the input signal detection unit 180 outputs a detection signal Sig_in having a first level (e.g. high level) to a next stage system. When the power input terminal 110 receives the DC input voltage Vin_dc, the input signal detection unit 180 outputs the detection signal Sig_in having a second level (e.g. low level) to the next stage system.

In detail, the input signal detection unit 180 includes a resistor R1, a resistor R2, a resistor R3 and a transistor Q1. In the structure, a first terminal of the resistor R1 is electrically connected to the first terminal 182 of the input signal detection unit 180. A second terminal of the resistor R1 is electrically connected to a control terminal (e.g. base) of the transistor Q1. A first terminal of the resistor R2 is electrically connected to the second terminal of the resistor R1. A second terminal of the resistor R2 is electrically connected to the ground. A first terminal of the resistor R3 is electrically connected to the power output terminal 190. A second terminal of the resistor R3 is electrically connected to an output terminal 186 of the input signal detection unit 180 and a first terminal (e.g. collector) of the transistor Q1. A second terminal (e.g. emitter) of the transistor Q1 is electrically connected to the ground.

In some embodiments of the present invention, the power conversion device 200 includes the filter unit 130. A first terminal 132 of the filter unit 130 is electrically connected to the second terminal 124 of the AC/DC conversion unit 120. A second terminal 134 of the filter unit 130 is electrically connected to the power output terminal 190. The filter unit 130 is used to filter out the noise so that the DC output voltage Vout is stable and fulfills the power requirement of the next stage system.

For convenience, the operations of the power conversion device 200 will be described with reference of FIG. 3A and FIG. 3B for two situations that the power input terminal 110 receives the AC input voltage Vin_ac or the DC input voltage Vin_dc.

Figure 3A:
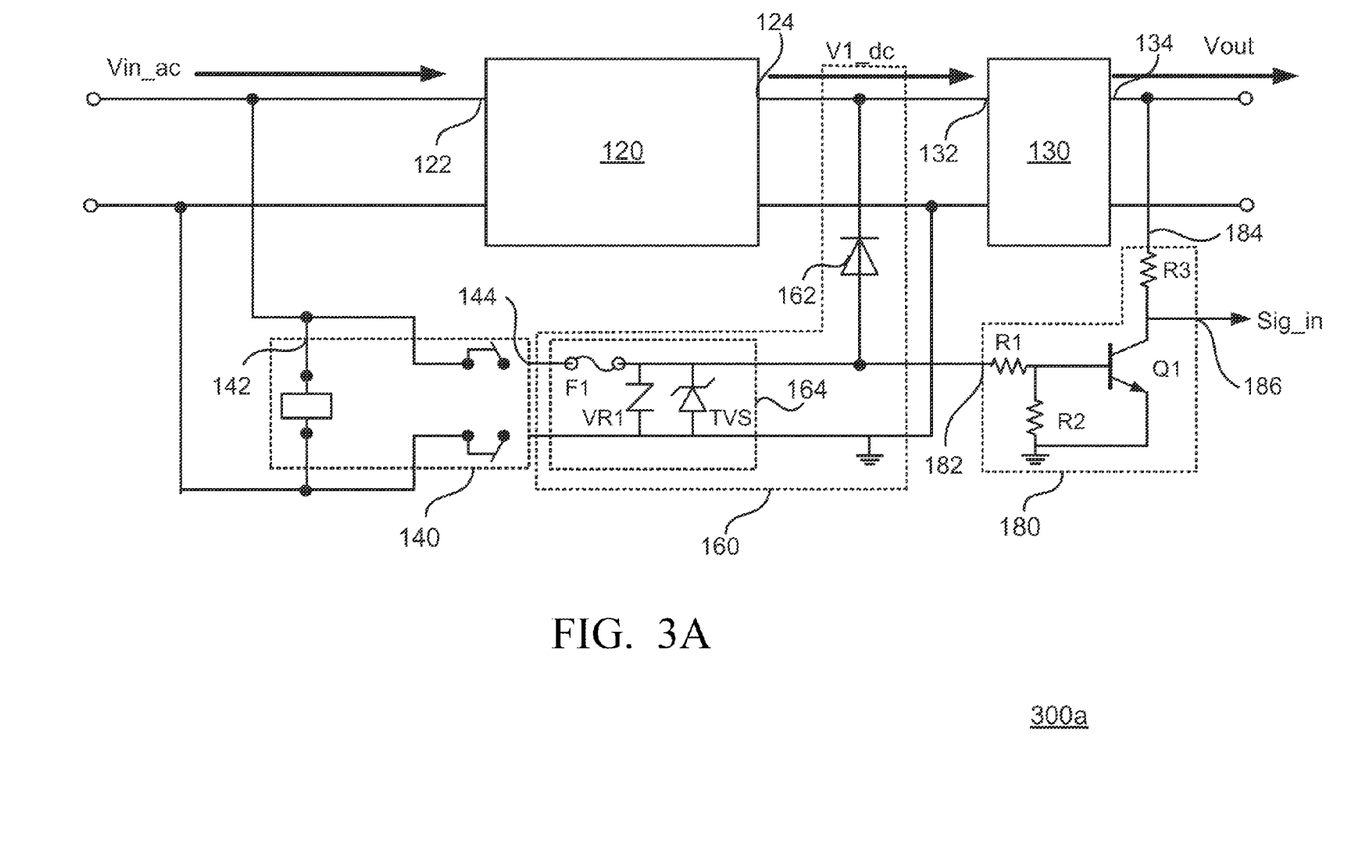
FIG. 3A and FIG. 3B are operation schematic diagrams illustrating the power conversion device according to an embodiment of the present invention.
Figure 3B:
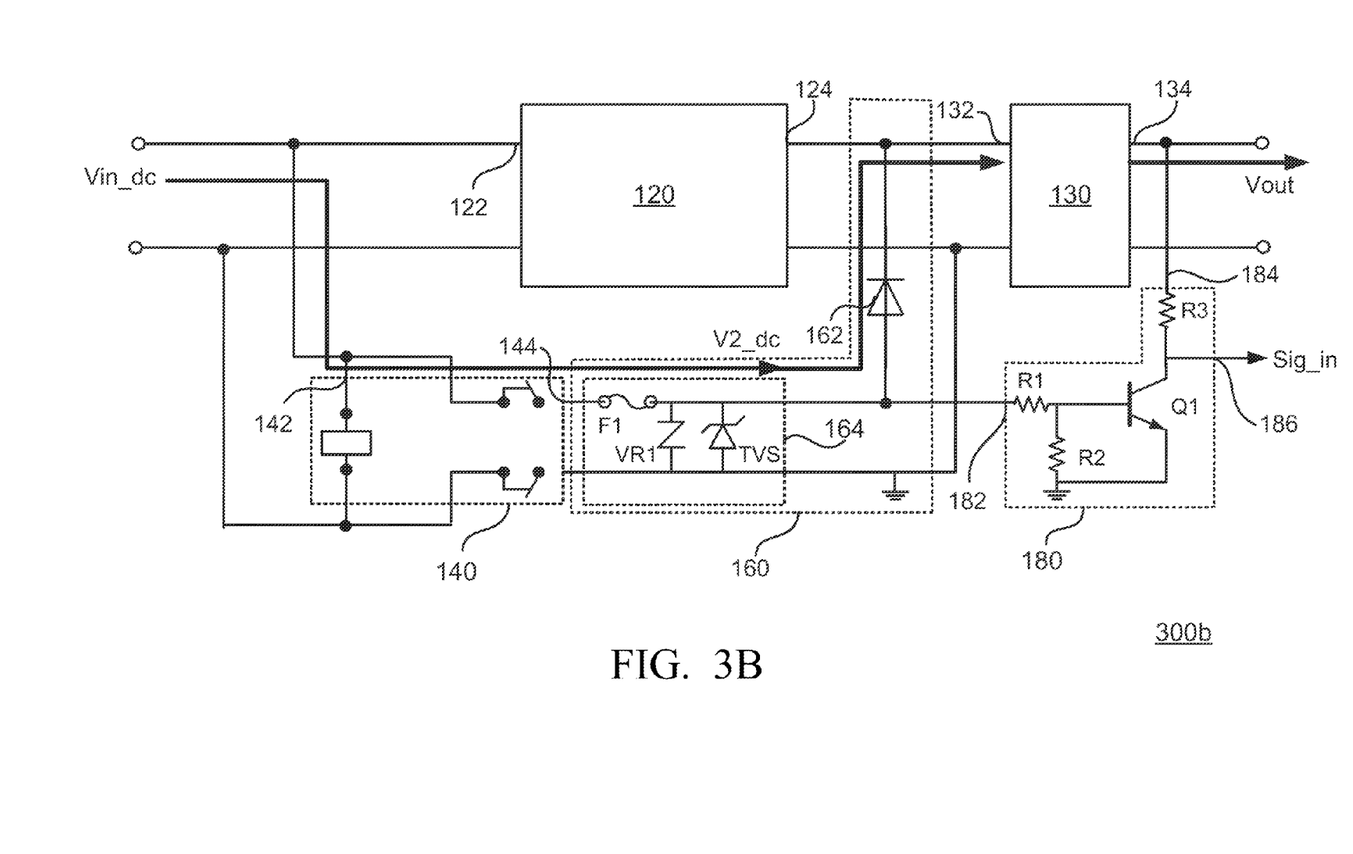

Referring to FIG. 3A and FIG. 3B, FIG. 3A and FIG. 3B are operation schematic diagrams illustrating a power conversion device 300a according to an embodiment of the present invention. As shown in FIG. 3A, when the power input terminal 110 receives the AC input voltage Vin_ac, the bypass circuit 160 is turned off due to the operations of the switch unit 140 and the overvoltage protection unit 164, and the AC/DC conversion unit 120 outputs the DC voltage signal V1_dc according to the AC input voltage Vin_ac. The filter unit 130 filters the DC voltage signal V1_dc outputted from the AC/DC conversion unit 120, and removes the noise in the DC voltage signal V1_dc to output the DC output voltage Vout. Therefore, the DC output voltage Vout is stable to fulfill the power requirement of the next stage system.

In addition, the first terminal (e.g. positive terminal) of the current blocking unit 162 has a low voltage level since the bypass circuit 160 is turned off, and therefore a control signal divided by the resistor R1 and R2 and received by the control terminal (e.g. base) of the transistor Q1 also has the low voltage level. Consequently, the transistor Q1 is off, and the first terminal (e.g. collector) of the transistor Q1 keeps on the high voltage level and outputs the detection signal Sig_in having the first level (e.g. high level) to the next stage system.

In contrast, as shown in FIG. 3B, when the power input terminal 110 receives the DC input voltage Vin_dc, the AC/DC conversion unit 120 is not activated because it is protected by the low voltage detection. The switch unit 140 turns on the bypass circuit 160, such that the bypass circuit 160 outputs the DC voltage signal V2_dc according to the DC input voltage Vin_dc. The filter unit 130 filters the DC voltage signal V2_dc and removes the noise therein to output the DC output voltage Vout. Therefore, the DC output voltage Vout is stable to fulfill the power requirement of the next stage system.

Because the bypass circuit 160 is turned on, the first terminal 182 of the input signal detection unit 180 also receives the DC input voltage Vin_dc and has the high voltage level (e.g. 12 volts). After the DC input voltage Vin_dc is divided by the resistor R1 and R2, the control terminal (e.g. base) of the transistor Q1 receives the control signal with high voltage level. Therefore, the transistor Q1 is on, and the first terminal (e.g. collector) of the transistor Q1 is conductive to the ground. The first terminal (e.g. collector) of the transistor Q1 has the low voltage level and outputs the detection signal Sig_in having the second level (e.g. low level) to the next stage system.

As a result, the input signal detection unit 180 can detect the type of the signal received by the power input terminal 110 and correspondingly outputs the detection signal Sig_in to the next stage system so that the next stage system can adjust its operation accordingly. For example, when the electricity mains is abnormal and the power input terminal 110 receives the DC input voltage Vin_dc provided by a backup power supply, the next stage system may perform some operations according to the detection signal Sig_in such as entering a save mode or backing up data.

Figure 4:
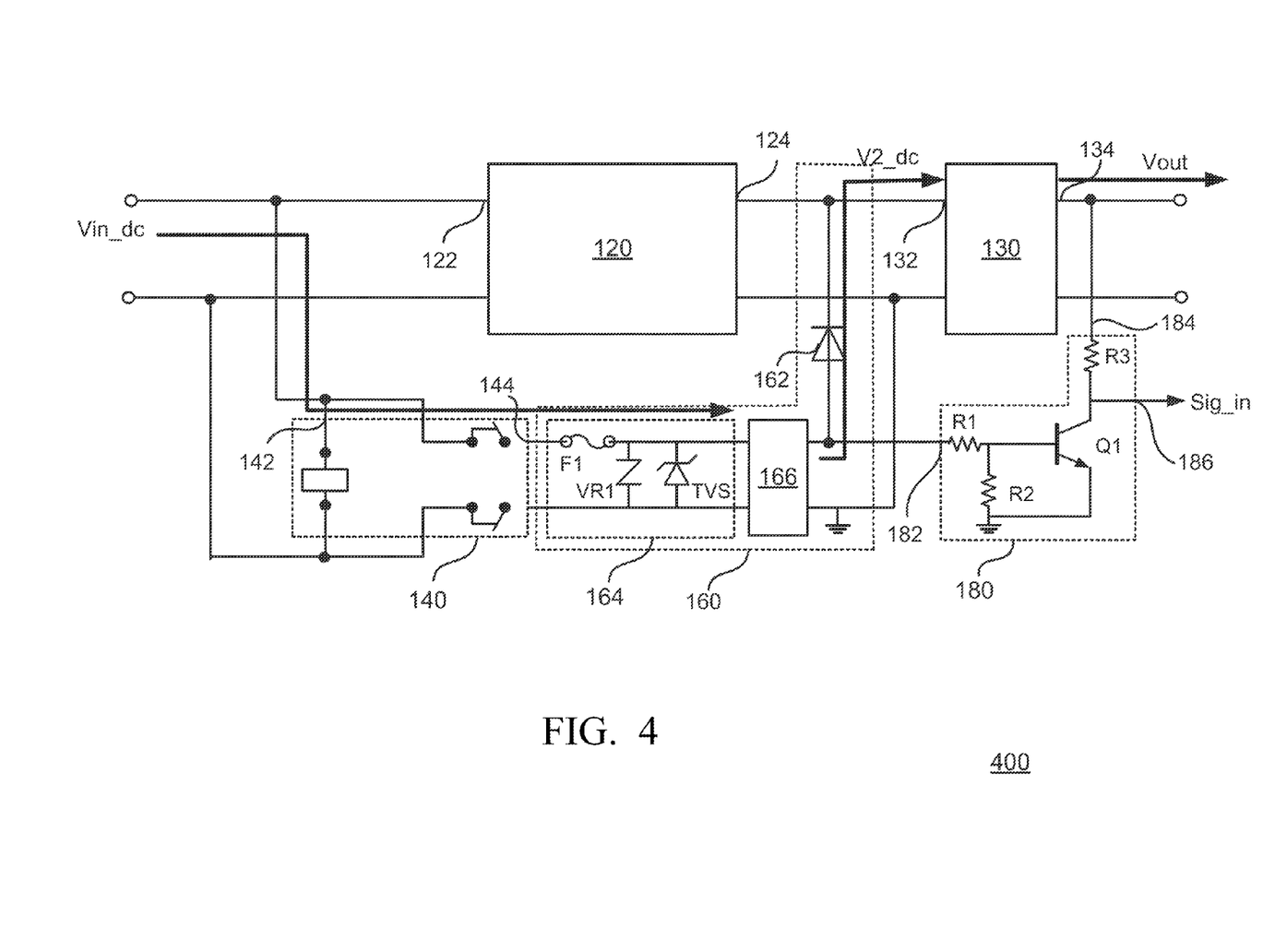
FIG. 4 is a schematic diagram illustrating the power conversion device according to an embodiment of the present invention.

Referring to FIG. 4, FIG. 4 is a schematic diagram illustrating a power conversion device 400 according to an embodiment of the present invention. In the embodiment, the bypass circuit 160 further includes a DC/DC conversion unit 166. The DC/DC conversion unit 166 has a first terminal electrically connected to the overvoltage protection unit 164 and a second terminal electrically connected to current blocking unit 162. The DC/DC conversion unit 166 is used to adjust the voltage level of the DC input voltage Vin_dc to output the DC output voltage Vout. For example, the DC input voltage Vin_dc is a DC voltage with 24 volts, and the DC/DC conversion unit 166 decreases the voltage level of the DC input voltage Vin_dc to output the DC output voltage Vout with 12 volts. As a result, the voltage levels of the DC input voltage Vin_dc and the DC output voltage Vout can be adjusted according to practical requirements. People in the art should be able to understand that the function of the DC/DC conversion unit 166 may be implemented by any type of DC-DC converter which is not described in detail herein.

Figure 5:
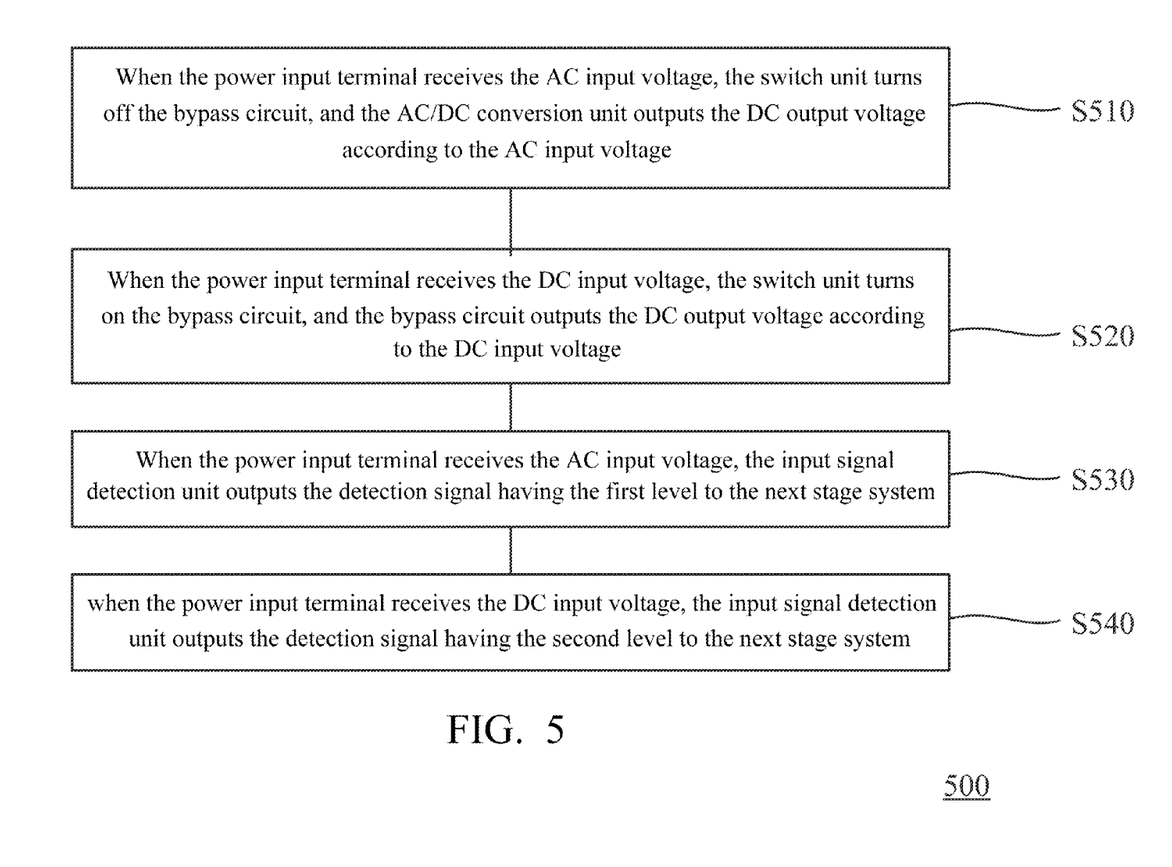
FIG. 5 is a flow chart of a control method for the power conversion device according to an embodiment of the present invention.

Referring to FIG. 5, FIG. 5 is a flow chart of a control method 500 for the power conversion device according to an embodiment of the present invention. For convenience, the control method 500 in FIG. 5 is described with reference of the power conversion device 300a in the embodiments of FIG. 3A and FIG. 3B, but the invention is not limited thereto.

The control method 500 includes a step S510 and a step S520. In some embodiments, the control method 500 further includes a step S530 and a step S540.

In the step S510, when the power input terminal 110 receives the AC input voltage Vin_ac, the switch unit 140 turns off the bypass circuit 160, and the AC/DC conversion unit 120 outputs the DC output voltage Vout according to the AC input voltage Vin_ac.

In the step S520, when the power input terminal 110 receives the DC input voltage Vin_dc, the switch unit 140 turns on the bypass circuit 160, and the bypass circuit 160 outputs the DC output voltage Vout according to the DC input voltage Vin_dc.

In the step S530, when the power input terminal 110 receives the AC input voltage Vin_ac, the input signal detection unit 180 outputs the detection signal Sig_in having the first level (e.g. high level) to the next stage system.

In the step S540, when the power input terminal 110 receives the DC input voltage Vin_dc, the input signal detection unit 180 outputs the detection signal Sig_in having the second level (e.g. low level) to the next stage system.

The specific operations and functions of the control method 500 have been described above. People in the art should be able to understand how the control method 500 accomplishes the operations and the functions based on the power conversion device 300a and 300b in the embodiments, and therefore they will not be repeated.

The content described above includes exemplary steps, but these steps need not be executed sequentially. The order of the steps mentioned in the embodiments can be adjusted according to practical requirements unless it is particularly specified. Alternatively, all steps or part of the steps can be executed at the same time.

In the embodiments, no matter the power conversion device receives the high-voltage AC power or the low-voltage DC power, the power conversion device can switch automatically to output a stable voltage to the next stage system though the configuration of the switch unit. It simplifies the complicated circuit design and the control method in the prior art. Applying the power conversion device manages the power efficiently and makes the power conversion device more secure.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. For example, different types of AC/DC converters and DC/DC converters or any power electronic equipment known in the art can be used in the embodiments to implement the power conversion device of the invention. In view of the foregoing, it is intended that the present invention cover modifications and variations of this invention provided they fall within the scope of the following claims.

What is claimed is:

1. A power conversion device, comprising:
   an alternating current (AC)/direct current (DC) conversion unit, configured to receive an AC input voltage through a power input terminal, and output a DC output voltage to a power output terminal according to the AC input voltage;
   a switch unit, wherein the switch unit is switched off according to the AC input voltage received from the power input terminal, and is switched on according to a DC input voltage received from the power input terminal; and
   a bypass circuit, configured to receive the DC input voltage through the switch unit, and output the DC output voltage to the power output terminal according to the DC input voltage, wherein the bypass circuit comprises: an overvoltage protection unit electrically connected to the switch unit and configured to turn off the bypass circuit when a voltage signal outputted from the switch unit is greater than a predetermined value.

2. The power conversion device of claim 1, wherein, wherein the overvoltage protection unit comprises:
   a fuse having a first terminal electrically connected to the switch unit and a second terminal;
   a varistor having a first terminal electrically connected to the second terminal of the fuse and a second terminal; and
   a transient voltage suppression (TVS) diode having a first terminal electrically connected to the second terminal of the fuse and a second terminal electrically connected to the second terminal of the varistor.

3. The power conversion device of claim 1, wherein the bypass circuit further comprises:
   a DC/DC conversion unit, configured to receive the DC input voltage and convert the DC input voltage into the DC output voltage.

4. The power conversion device of claim 1, wherein the bypass circuit comprises:
   a current blocking unit having a first terminal electrically connected to the switch unit and a second terminal electrically connected to the power output terminal, and configured to prevent a reverse current from flowing from the power output terminal into the bypass circuit.

5. The power conversion device of claim 4, wherein the bypass circuit further comprises:
   an input signal detection unit electrically connected to the current blocking unit, wherein when the power input terminal receives the AC input voltage, the input signal detection unit is configured to output a detection signal having a first level to a next stage system, and when the power input terminal receives the DC input voltage, the input signal detection unit is configured to output the detection signal having a second level to the next stage system.

6. The power conversion device of claim 5, wherein the input signal detection unit detects whether the power input terminal receives the AC input voltage or the DC input voltage according to a voltage level of the first terminal of the current blocking unit.

7. The power conversion device of claim 1, further comprising:
   a filter unit electrically connected to the AC/DC conversion unit, and configured to filter a DC voltage signal outputted from the AC/DC conversion unit to output the DC output voltage.

8. A power conversion device, comprising:
   an alternating current (AC)/direct current (DC) conversion unit electrically connected to a power input terminal, and configured to receive an AC input voltage through the power input terminal, and output a DC output voltage to a power output terminal according to the AC input voltage;
   a switch unit electrically connected to the power input terminal, wherein the switch unit is switched off according to the AC input voltage received from the power input terminal, and is switched on according to DC input voltage received from the power input terminal;
   an input signal detection unit, configured to output a detection signal having a first level to a next stage system according to the AC input voltage, and output the detection signal having a second level to the next stage system according to the DC input voltage;
   a current blocking unit having a first terminal electrically connected to the input signal detection unit and a second terminal electrically connected to the power output terminal, and configured to keep a reverse current from flowing from the power output terminal into the input signal detection unit; and
   an overvoltage protection unit, electrically connected between the switch unit and the input signal detection unit, and configured to turn off the switch unit and the input signal detection unit when a voltage signal outputted from the switch unit is greater than a predetermined value.

9. The power conversion device of claim 8, further comprising:
   a DC/DC conversion unit electrically connected between the overvoltage protection unit and the current blocking unit, and configured to receive the DC input voltage and convert the DC input voltage into the DC output voltage.

10. The power conversion device of claim 8, further comprising:
    a filter unit electrically connected to the AC/DC conversion unit, and configured to filter a DC voltage signal outputted from the AC/DC conversion unit to output the DC output voltage.

11. The power conversion device of claim 8, wherein the overvoltage protection unit comprises:
    a fuse having a first terminal electrically connected to the switch unit and a second terminal;
    a varistor having first terminal electrically connected to the second terminal of the fuse and a second terminal; and
    a transient voltage suppression (TVS) diode having a first terminal electrically connected to the second terminal of the fuse and a second terminal electrically connected to the second terminal of the varistor.

12. A control method for a power conversion device, wherein the power conversion device comprises a power input terminal, an input signal detection unit, an alternating current (AC)/direct current (DC) conversion unit, a switch unit and a bypass circuit, and the control method comprises:
    turning off, by the switch unit, the bypass circuit and outputting, by the AC/DC conversion unit, a DC output voltage according to an AC input voltage when the power input terminal receives the AC input voltage; and turning on, by the switch unit, the bypass circuit and outputting, by the bypass circuit, the DC output voltage according to a DC input voltage when the power input terminal receives the DC input voltage;

outputting, by the input signal detection unit, a detection signal having a first level to a next stage system when the power input terminal receives the AC input voltage; and outputting, by the input signal detection unit, the detection signal having a second level to the next stage system when the power input terminal receives the DC input voltage.

* * * * *